United States Patent [19]

D'Iribarne et al.

[11] Patent Number: 5,059,235
[45] Date of Patent: Oct. 22, 1991

[54] APPARATUS FOR BENDING GLASS PANES

[75] Inventors: Benoit D'Iribarne, Laidon - Pasildon, England; Luc Vanaschen, Eupen, Belgium; Hans-Josef Promper; Hans-Werner Kuster, both of Aachen, Fed. Rep. of Germany

[73] Assignee: Saint-Gobain Vitrage International, Courbevoie, France

[21] Appl. No.: 575,487

[22] Filed: Aug. 30, 1990

[30] Foreign Application Priority Data

Sep. 1, 1989 [DE] Fed. Rep. of Germany ....... 3929042

[51] Int. Cl.$^5$ ............................................. C03B 23/03
[52] U.S. Cl. ......................................... 65/287; 65/323
[58] Field of Search ........................ 65/323, 287, 106

[56] References Cited

U.S. PATENT DOCUMENTS 4,199,342  4/1980  Mestre et al. .......................... 65/106
4,437,871  3/1984  McMaster et al. .................... 65/106

Primary Examiner—Joye L. Woodard
Attorney, Agent, or Firm—Oblon, Spivak, McClelland, Maier & Neustadt

[57] ABSTRACT

In an apparatus for bending glass panes in a horizontal position, comprising an upper bending mold and a lower frame-shaped mold, the bending force exerted by the bending mold is determined by the self-weight of the bending mold. In order that a uniform pressure shall be exerted by the upper bending mold on the entire periphery of the lower frame-shaped mold, the upper bending is mounted displaceable on its guide rods relative to them in a vertical direction and variable in its angular position relative to the guide rods. To achieve the desired relief of weight of the bending mold, the guide rods are suspended by cables from a frame which can be lowered. On the frame, hydraulic or pneumatic cylinders are disposed, which each exert, via a pulling cable acting on a guide rod, an adjustable force in the opposite direction to the self-weight of the bending mold.

10 Claims, 3 Drawing Sheets

APPARATUS FOR BENDING GLASS PANES

BACKGROUND OF THE INVENTION

1. Field of the Invention

The present invention relates to an apparatus for bending glass panes in a horizontal position, comprising a bending mold fixed, above the conveying plane of the glass panes, to vertical guide rods and arranged to be raised and lowered by these rods, the bending force of which is determined by the self-weight of the bending mold, and comprising at least one lower bending mold, capable of being horizontally traversed in the direction of conveying of the glass panes.

2. Description of the Related Art

Bending apparatuses of this type are known in various forms of construction. In one form of construction, a single, lower peripheral bending mold is provided, which can be traversed between a transfer station and the bending station (EP 0 183 418). In the transfer station, the glass pane, heated in a roller once-through furnace to bending temperature and lifted off the conveying rollers by a suction plate disposed above the conveying plane, is laid down on the lower peripheral bending mold, and the lower peripheral bending mold is then traversed, together with the glass pane, beneath the upper bending mold.

In another known apparatus of the initially named type, the glass panes are conveyed on a conveyor roller path into the bending station, in which the last portion of the conveyor roller path is lowered, the glass pane being laid down on a lower, peripheral bending mold. The upper bending mold then descends and carries out the pressing operation. The bent glass pane is then, together with the peripheral bending mold, withdrawn from the bending station, while at the same time a new peripheral bending mold is brought into the bending station (EP 0 062 814).

A further form of construction of an apparatus according to the above category is also known, wherein the plane glass panes are conveyed on peripheral bending molds through the heating furnace and are bent into their final shape in the bending station by means of the upper bending mold.

In all the bending apparatuses of this category, it is difficult to position the horizontally displaceable, lower peripheral bending mold underneath the upper bending mold sufficiently accurately for the upper bending mold to press on the glass pane during the pressing operation with uniform force along the entire periphery of the pane. With the known constructions it is, as a rule, unavoidable that at some positions the upper bending mold will press with a higher force than at other positions onto the glass pane supported by the peripheral bending mold, which can lead to indentations on the glass pane or indeed to local deformations of the peripheral bending molds.

It is also known and common to avoid local pressure points on the glass pane by fitting adjustable stops outside the periphery of the pane on the peripheral bending mold (EP 0 237 231). Consequently, however, the pressure force is fully transmitted to these local stops, so that the risk of deformation of the peripheral bending mold is further increased. Moreover, in this case it is not possible to apply a uniform pressure along the entire periphery of the glass pane, because the stops inevitably must be adjusted to a somewhat greater distance than the thickness of the glass panes.

SUMMARY OF THE INVENTION

Accordingly, an object of the present invention is to provide for a novel bending apparatus in which, a uniform pressing pressure can be safely achieved along the entire periphery of the pane.

According to the invention this is achieved in that the upper bending mold is mounted on the guide rods displaceable in a vertical direction relative to them and variable in its angular orientation relative to the guide rods.

The guide rods, on the one hand assure the vertical guidance of the bending mold while, on the other hand, by the fixing according to this invention of the bending mold to the guide rods an easily operated change to the angular position of the upper bending mold is achieved. The pressing force is thereby independent of the position in height at any time of the lower peripheral bending mold, and the upper bending mold adjusts itself to each even very slight change in orientation of the lower peripheral bending mold and, as a consequence of this resilient suspension, exerts a very uniform pressing pressure along the entire periphery of the pane.

To enable the pressing pressure, the maximum value of which is determined by the self-weight of the upper bending mold, to be adjusted to an optimum value each time as a function of the size and possibly of the shape of the glass panes, it is provided in a further embodiment of this invention to equip each guide rod with an adjustable weight-relief apparatus. In an advantageous manner, each weight-relief apparatus consists of a pneumatic or hydraulic pressure cylinder with preselectable pressure of the pressure medium. By appropriate adjustment of the pressure in the pressure cylinder, the pressing force of the bending molds is adjustable within wide limits and can be set to its optimum value each time within these limits as a function of the size and the desired shape of the glass panes.

Accordingly, the present invention relates to an apparatus for bending glass panes in an horizontal position, comprising an upper bending mold fixed above a conveying plane of the glass panes to vertical guide rods. The upper bending mold being arranged to be raised and lowered by the guide rods, wherein a bending force of the upper bending mold is determined by the self-weight of the upper bending mold. The apparatus further comprises at least one lower bending mold which can be horizontally traversed in a conveying direction of the glass panes. The upper bending mold is mounted on the guide rods to be displaceable relative to the guide rods in a vertical direction and variable in its angular orientation relative to the guide rods.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
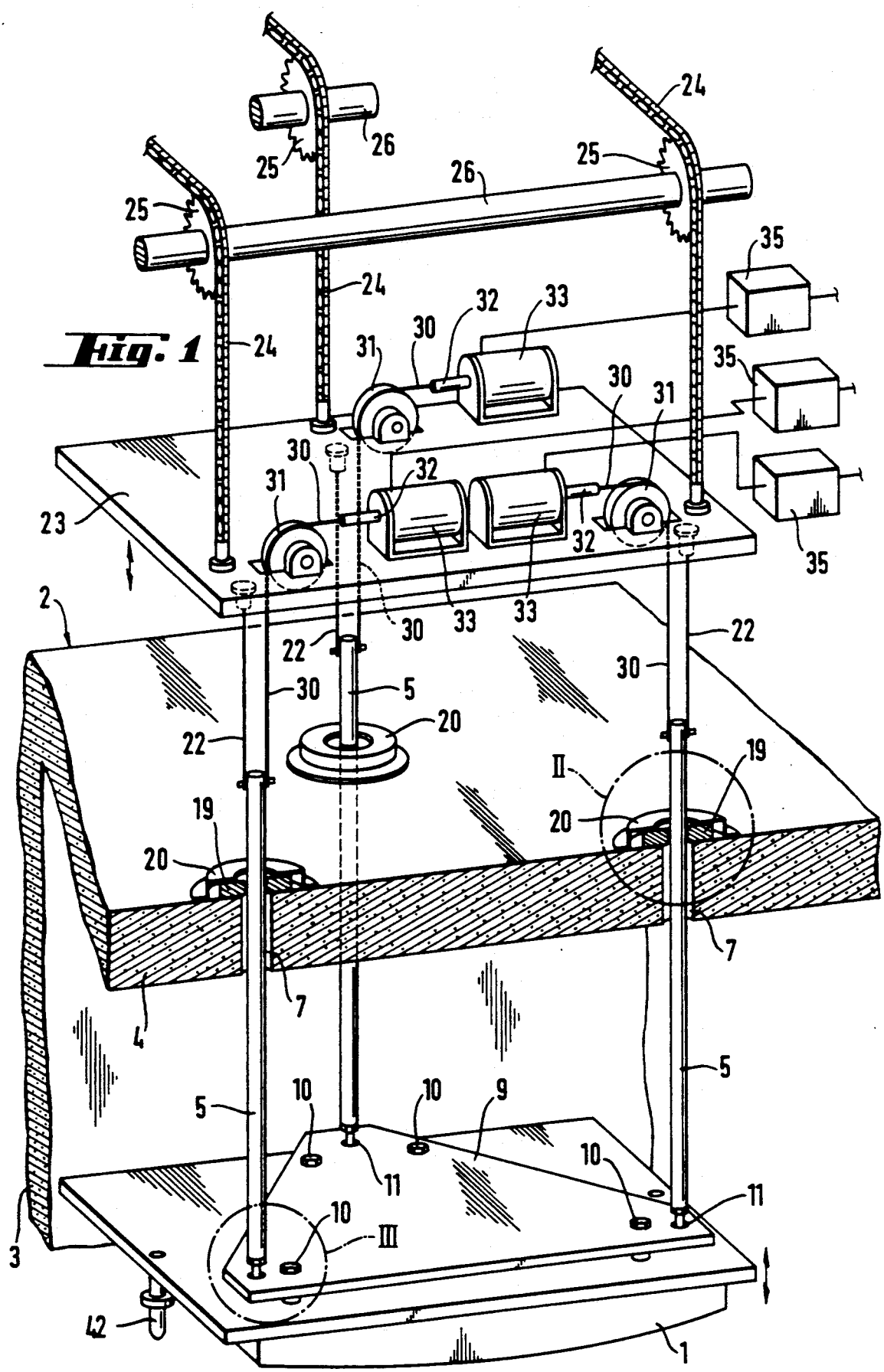
FIG. 1 shows the suspension and mounting of the upper bending mold of a pressing bending station, in perspective view.

In FIG. 1, for clarity purposes, only the upper bending mold of a bending station including its suspension and drive elements is illustrated. The upper bending mold 1 is disposed vertically adjustable at a specific position within a bending furnace and cooperates with one or more lower, peripheral bending molds, not illustrated in this figure.

In the case illustrated, the bending station is disposed within the furnace 2, which comprises side walls 3 and a furnace roof 4. The actual bending molds, that is to say the upper bending mold 1 including its guide rods 5, are therefore situated in an environment having a relatively high temperature of about 650° Celsius, so that in particular the bearings which make possible a sliding relative movement must possess a robust construction.

The guide rods 5, by which the upper bending mold is raised and lowered, pass through apertures 7 in the furnace roof 4. The apertures 7 have a diameter clearly greater than the guide rods 5 and make possible a slight displacement and/or tilting movement of the guide rods 5.

The upper bending mold 1 is provided, on its upper face, with a fixing plate 9, which is disposed at a certain distance from the upper face of the bending mold and is connected with the bending mold, for example by bolts 10.

Figure 3:
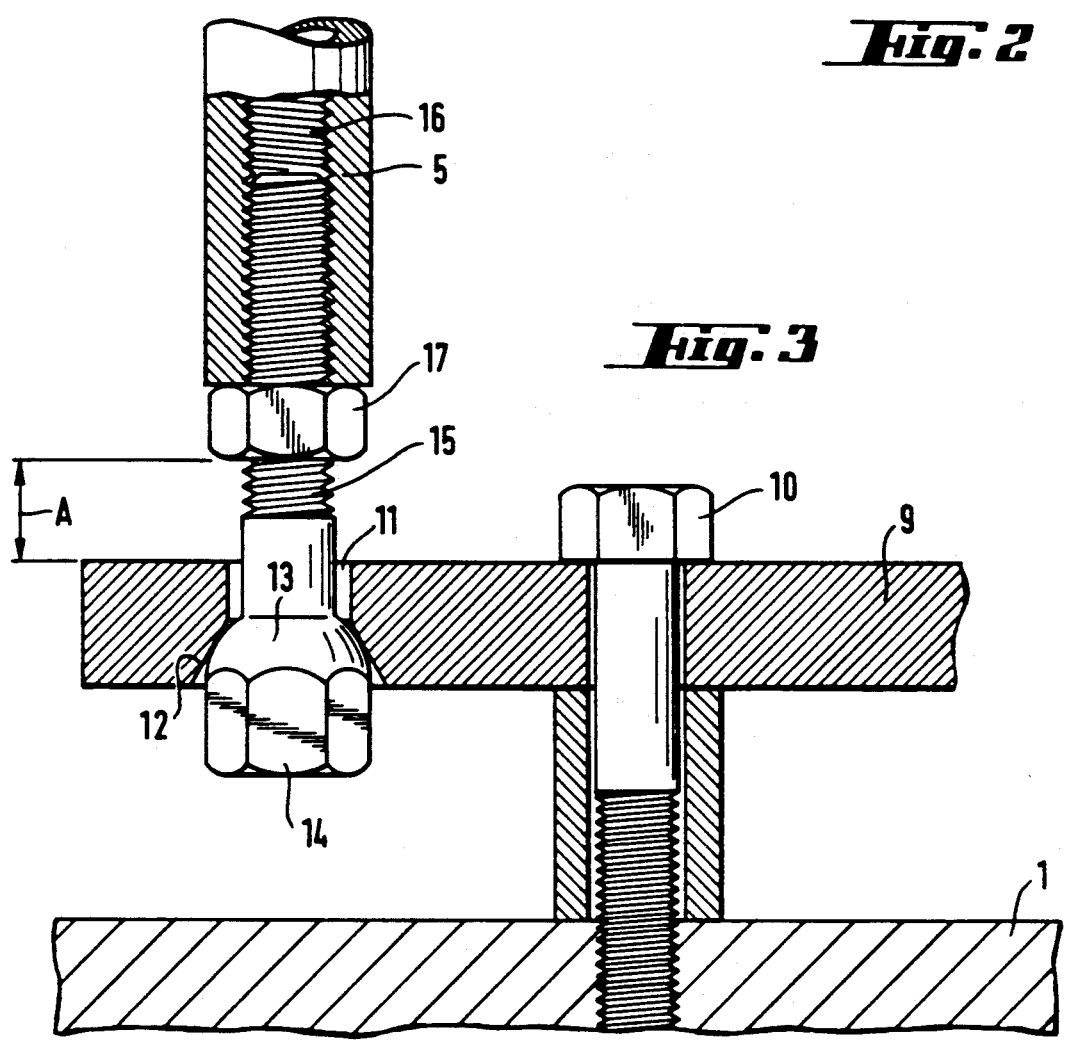
FIG. 3 shows the bearing referenced III in FIG. 1 for the guide rods, to enlarged scale.

The mounting of the fixing plate 9 on the rods 5 can be seen in detail from FIG. 3. The fixing plate 9 is provided, at each appropriate position, with a bore 11. On the lower face of the fixing plate 9, the bore 11 is widened out by a conical surface 12, which rests upon the spherical segment 13 of a bolt head 14. Instead of a conical surface 12, a spherical dish-shaped widening-out of the bore 11 could also be provided. The bolt head 14 with the spherical segmental surface 13 is seated at the end of a threaded shank 15, which is screwed into a threaded bore 16 in the lower end of the fixing rod 5 and is secured by the lock nut 17.

The bore 11 in the fixing plate 9 has a larger diameter than the bolt shank 15 passing through this bore, so that angular tilting movements between the fixing plate 9 and the bolt shank are possible to a desired extent. Furthermore, between the upper face of the fixing plate 9 and the lock nut 17, a spacing A is provided, which makes possible a sufficient vertical relative displacement between the fixing plate 9 and the guide rod 5.

Figure 2:
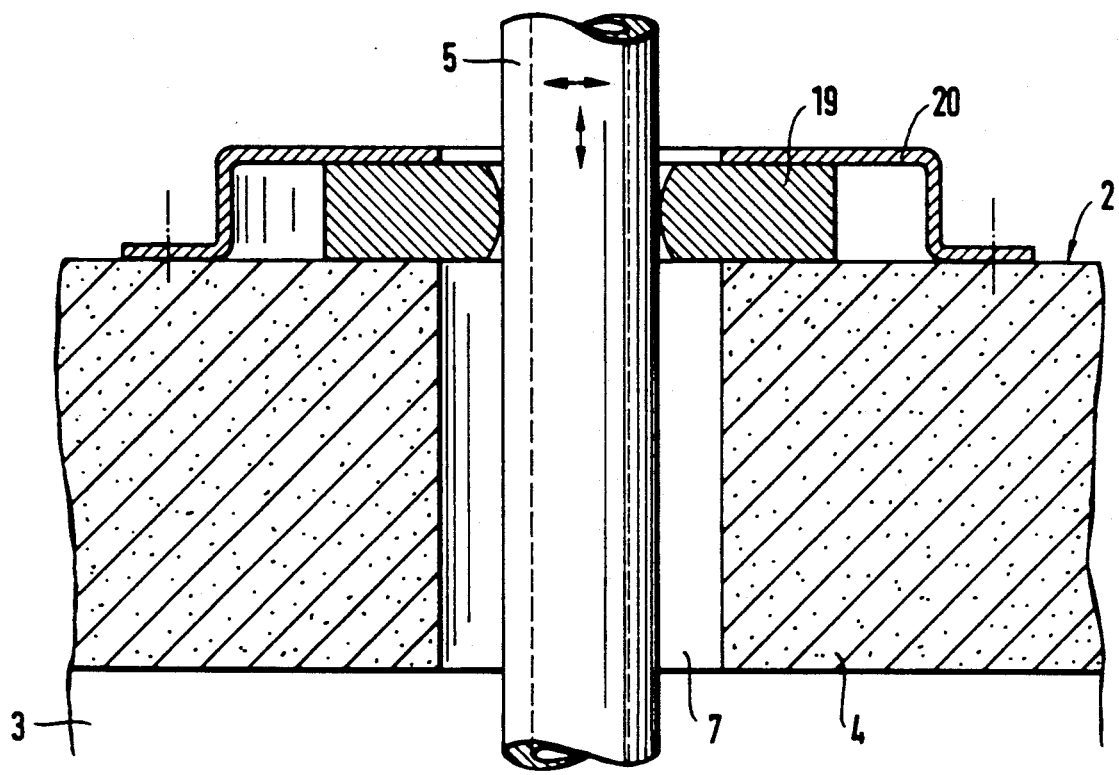
FIG. 2 shows the detail referenced II in FIG. 1, to larger scale.

As FIG. 2 shows in detail, the annular gap remaining between the guide rod 5 and the wall of the aperture 7 is covered by an annular washer 19, mounted loosely on the furnace roof 4, in order to avoid heat losses of the furnace and undesired heating-up of the suspension and actuating mechanism disposed above the furnace. A retaining ring 20, encompassing the annular washer 19, assures the necessary holding of the annular washer 19 and permits a sliding horizontal displacement capability of the annular washer 19.

The guide rods 5 are, as can be seen in detail from FIG. 1, secured above the furnace roof 4 by cables or chains 22 to a frame 23. The frame 23 is, in turn, suspended in a horizontal position from cables or chains 24. The chains 24 cooperate with chain wheels 25, associated with them. The chain wheels 25 are mounted on one or more shafts 26 and are set in rotation by means of a drive motor, not shown, for the purpose of raising and lowering the bending mold 1. For bending a glass pane, therefore, the frame 23 is lowered, causing under the action of its self-weight the guide rods 5 and the bending mold 1 to descend towards the peripheral bending mold positioned underneath the bending mold 1. As soon as the bending mold 1 rests at one point on the peripheral bending mold, with clamping of the glass pane between, the bending mold 1 stops at this height at this point, and the corresponding cable 22 is relieved of load. The frame 23 is lowered sufficiently far, until all the chains 22 are completely relieved of load and the upper bending mold 1 rests, with its self-weight and the weight of the guide rods 5, on the glass pane and therefore on the lower peripheral bending mold.

For deliberately reducing the pressing pressure, the maximum value of which is determined by the self-weight of the bending mold 1, devices are mounted on the frame 23, by which forces are exerted on the individual fixing rods 5 in the opposite direction to the self-weight of the bending mold, the magnitude of these forces being adjustable. For this purpose, at the upper end of each guide rod 5, a further cable or chain 30 is attached. The cable 30 runs over a deflector wheel 31, mounted on the frame 23, and is attached to the piston rod 32 of a hydraulic or pneumatic cylinder 33. The cylinder 33 is loaded, on the side of the piston towards the cable 30, with a pressure medium, the pressure of which is adjustable and remains constant independently of the travel of the piston in the cylinder. In this way, a portion of any desired value of the self-weight of the bending mold can be compensated and thus the bending force exerted can be finely set. The setting and regulating of the pressure medium may, for example, be carried out by a pressure regulator 35, which on the one hand makes possible the setting of the desired pressure and on the other hand contains a regulating device which ensures that the preselected pressure maintains its value, independently of the piston movement in the cylinder 33.

Each of the guide rods 5, of which for example three are provided, is equipped in the same way with its own load-relief cable 30 and its own cylinder and also its own pressure regulator, so that if desired each of the guide rods 5 can be relieved of load by a different force.

Figure 4:
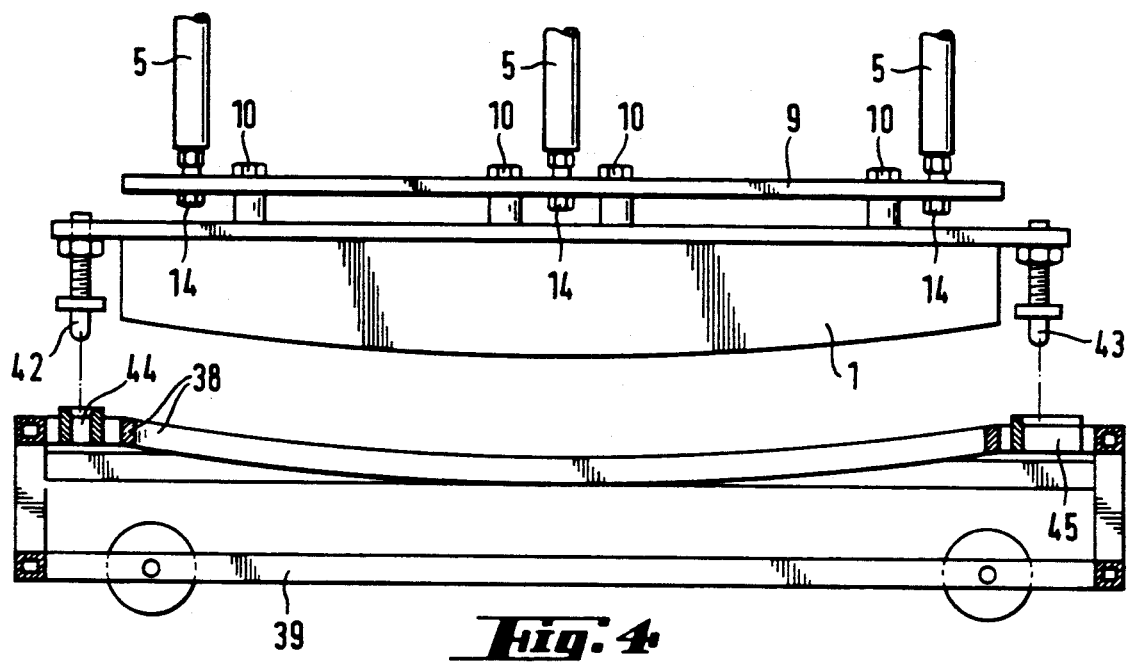
FIG. 4 shows the upper bending mold in cooperation with the lower frame bending mold, shown as a vertical longitudinal section.
Figure 5:
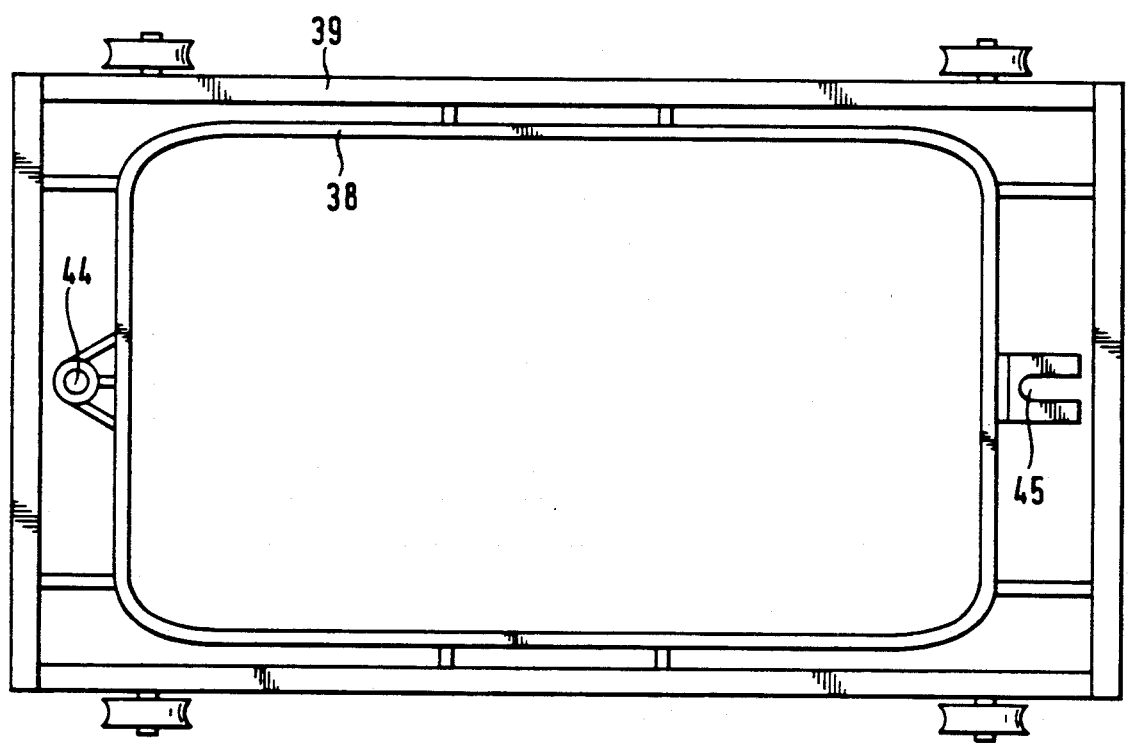
FIG. 5 shows a plan on the lower frame bending mold in FIG. 4.

FIG. 4 and FIG. 5 show the upper bending mold 1 in cooperation with a lower peripheral bending mold 38, which is mounted on a traversable carriage 39. For assuring the correct relative positioning of upper bending mold 1 and lower peripheral bending mold 38, the upper bending mold comprises two centering pins 42, 43, which cooperate with corresponding centering openings 44, 45 on the lower peripheral bending mold. The centering opening 45 is in the form of an elongate hole, orientated towards the centering opening 44, formed as a circular eye, in order to compensate any possible changes in length due to different thermal expansion.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. Apparatus for bending glass panes in a horizontal position, comprising:
   an upper bending mold fixed above a conveying plane of the glass panes to vertical guide rods, said upper bending mold being arranged to be raised and lowered by the guide rods, wherein a bending force of said upper bending mold is determined by the self-weight of the upper bending mold; and
   at least one lower bending mold which can be horizontally traversed in a conveying direction of the glass panes; and
   means for mounting the upper bending mold on the guide rods so as to be displaceable relative to the guide rods in a vertical direction and variable in its angular orientation relative to the guide rods.

2. Apparatus according to claim 1, wherein the upper bending mold comprises a horizontal holding plate on which the mounting of the guide rods is effected.

3. Apparatus according to claim 2 wherein the mounting means comprises a bearing for providing the vertical and the angular displacement of the upper bending mold, said bearing comprising a spherical segment-shaped seating, disposed at the end of each guide rod, said spherical segment-shaped seating cooperating with a conical or spherical dish-shaped recess in the holding plate.

4. Apparatus according to one of claims 1 to 3, comprising a bending chamber having an upper closure roof, said upper closure roof comprising apertures, wherein said guide rods pass through the apertures in the upper closure roof, said apertures having a larger diameter than the guide rods and permitting a lateral displacement and inclination of the guide rods, wherein an annular gap formed between each of the guide rods and apertures is sealed by a horizontally displaceable annular plate.

5. Apparatus according to claim 4, wherein the guide rods are suspended by cables or chains from a frame which can be lowered, wherein means for exerting, via a pulling cable acting on the guide rod, a force opposed to the self-weight of the upper bending mold are disposed on said frame.

6. Apparatus according to claim 5, wherein said means for exerting the force in opposition to the self-weight of the upper bending mold are equipped with means for adjusting the magnitude of the force.

7. Apparatus according to claim 6, wherein said means for exerting the force in opposition to the self-weight of the upper bending mold are pneumatic or hydraulic pressure cylinders.

8. Apparatus according to claim 7, further comprising a pressure regulator for adjusting the pressure of a pressure medium fed to the pressure cylinder to a desired value which remains constant independently of the position of the piston in the pressure cylinder.

9. Apparatus according to claim 8, wherein the upper bending mold and the lower bending mold cooperating therewith comprise means for mutually centering both molds.

10. Apparatus according to claim 9, wherein the means for centering comprise a first centering pin mounted to said upper bending mold cooperating with a centering eye mounted to said lower bending mold, and a second centering pin mounted to said upper bending mold cooperating with means defining an elongate hole mounted to said lower bending mold and orientated towards the centering eye.

* * * * *